US008042115B2

(12) United States Patent
Dunshea et al.

(10) Patent No.: US 8,042,115 B2
(45) Date of Patent: Oct. 18, 2011

(54) METHOD AND SYSTEM FOR BALANCING COMPONENT LOAD IN AN INPUT/OUTPUT STACK OF AN OPERATING SYSTEM

(75) Inventors: Andrew Dunshea, Austin, TX (US); Stephen Alfred Haley, Round Rock, TX (US); Brian W. Hart, Austin, TX (US); Anil Kalavakolanu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 11/839,920

(22) Filed: Aug. 16, 2007

(65) Prior Publication Data

US 2009/0049450 A1 Feb. 19, 2009

(51) Int. Cl.
*G06F 9/46* (2006.01)
(52) U.S. Cl. ..................................... 718/105
(58) Field of Classification Search .................. 718/100, 718/105
See application file for complete search history.

(56) References Cited

U.S. PATENT DOCUMENTS

| | | | | |
|---|---|---|---|---|
| 6,560,717 B1 * | 5/2003 | Scott et al. | | 714/4 |
| 6,856,991 B1 * | 2/2005 | Srivastava | | 1/1 |
| 6,988,268 B2 * | 1/2006 | Zuberi | | 718/103 |
| 7,475,157 B1 * | 1/2009 | Tormasov | | 709/238 |
| 7,493,380 B2 * | 2/2009 | Aman et al. | | 709/223 |
| 7,616,640 B1 * | 11/2009 | Sitaraman et al. | | 370/395.1 |
| 2003/0018774 A1 * | 1/2003 | Flinck et al. | | 709/223 |
| 2003/0204552 A1 * | 10/2003 | Zuberi | | 709/103 |
| 2004/0059777 A1 * | 3/2004 | Palazzo et al. | | 709/203 |
| 2005/0055694 A1 * | 3/2005 | Lee | | 718/100 |
| 2005/0198200 A1 * | 9/2005 | Subramanian et al. | | 709/218 |
| 2009/0049450 A1 * | 2/2009 | Dunshea et al. | | 718/105 |
| 2010/0095304 A1 * | 4/2010 | Suzuki et al. | | 718/105 |

OTHER PUBLICATIONS

McLaughlin, "Load Balancing Buffered peripheral Subsystem", IBM Technical Disclosure bulletin, Jun. 1981, pp. 707-709.

* cited by examiner

*Primary Examiner* — Van Nguyen
(74) *Attorney, Agent, or Firm* — Yee & Associates, P.C.; David A. Mims, Jr.

(57) ABSTRACT

A system for balancing component load. In response to receiving a request, data is updated to reflect a current number of pending requests. In response to analyzing the updated data, it is determined whether throttling is necessary. In response to determining that throttling is not necessary, a corresponding request to the received request is created and a flag is set in the corresponding request. Then, the corresponding request is sent to one of a plurality of lower level components of an input/output stack of an operating system for processing based on the analyzed data to balance component load in the input/output stack of the operating system.

19 Claims, 8 Drawing Sheets

| CENTRAL REGISTRY ||||
| COMPONENT | THRESHOLD | FUNCTION | STATUS |
| --- | --- | --- | --- |
| A | YES | A:QueryThresh() | Near_Threshold |
| B | NO | -- | -- |
| C | YES | C:ThreshInfo() | Exceeded_Threshold |
| D | YES | -- | -- |

METHOD AND SYSTEM FOR BALANCING COMPONENT LOAD IN AN INPUT/OUTPUT STACK OF AN OPERATING SYSTEM

BACKGROUND OF THE INVENTION

1. Field of the Invention

The present invention relates generally to an improved data processing system. More specifically, the present invention is directed to a computer implemented method, system, and computer usable program code for distributing input/output requests to a plurality of software components in an input/output subsystem of an operating system.

2. Description of the Related Art

Today, components in an input/output (I/O) subsystem of a computer operating system interact by exchanging I/O request structures and by making "point in time" function calls to one another. Usually, an operation may pass through several layers of components in an actual computer operating system. For example, in an Advanced Interactive Executive (AIX®) operating system, which is a product of the International Business Machines (IBM®) Corporation located in Armonk, N.Y., it is not unusual for a disk I/O operation to involve six to eight component layers. The layers may, for example, include a file system layer, a virtual memory manager layer, a logical volume manager layer, a multi-path device driver layer, a disk device driver layer, a fibre channel protocol device driver layer, and a fibre channel adapter driver layer.

Generally, each component in the I/O stack accepts an I/O request from an upper level component or the component "above", performs some type of translation of the I/O request, and then issues the translated I/O request to a lower level component or the component "below". Later, operation completion indications flow up through the I/O stack, from the "bottom" to the "top". Typically, components at the "top" of the I/O stack interact with user applications, while components at the "bottom" of the I/O stack interact with physical devices.

However, during operation processing, bottlenecks may unpredictably occur in various layers within the software I/O stack, thus causing a crash in the data processing system. Currently, one solution to this bottleneck problem is to throttle I/O requests at the file system layer as the I/O requests enter the I/O stack. I/O throttling is a technique used to slow down processing of I/O requests by delaying the dispatch of the I/O requests to subsequent layers or components to prevent a system crash. This type of I/O throttling technique is insufficient because not all I/O requests enter the I/O stack via the file system. In addition, file systems may reside on various devices and may have differing characteristics. Further, file systems are an abstraction of the underlying devices and therefore do not, and should not, have information regarding details of the I/O stack "below" it.

Therefore, it would be beneficial to have an improved computer implemented method, system, and computer usable program code for distributing I/O requests to a plurality of software components in an I/O stack of an operating system to balance component load, increase system productivity, and prevent system crashes.

SUMMARY OF THE INVENTION

Illustrative embodiments provide a computer implemented method, system, and computer usable program code for balancing component load. In response to receiving a request, data is updated to reflect a current number of pending requests. In response to analyzing the updated data, it is determined whether throttling is necessary. In response to determining that throttling is not necessary, a corresponding request to the received request is created and a flag is set in the corresponding request. Then, the corresponding request is sent to one of a plurality of lower level components of an input/output stack of an operating system for processing based on the analyzed data to balance component load in the input/output stack of the operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
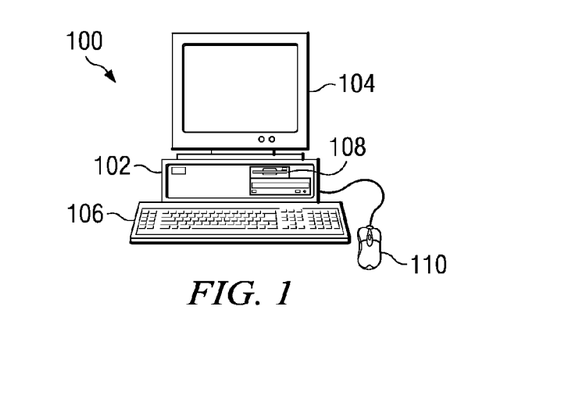
FIG. 1 is a pictorial representation of a data processing system in which illustrative embodiments may be implemented.
Figure 2:
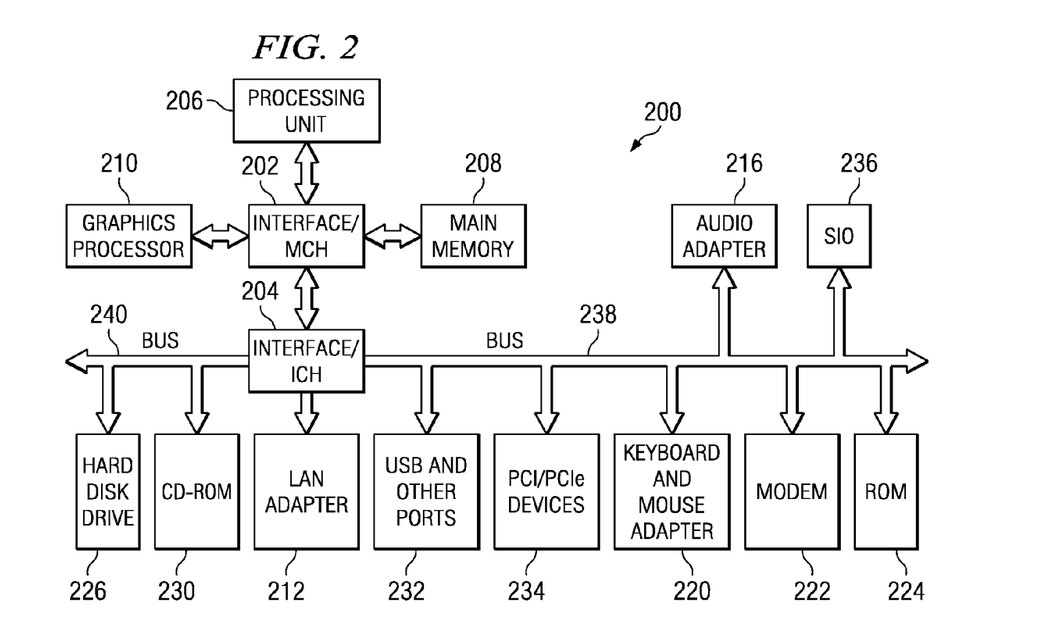
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a data processing system in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with computer 100. Examples of additional input devices may include, for example, a joystick, a touchpad, a touch screen, a trackball, and a microphone.

Computer 100 may be any suitable computer, such as an IBM® eServer™ computer or IntelliStation® computer, which are products of the International Business Machines Corporation. Although the depicted representation shows a computer, other embodiments may be implemented in other types of data processing systems. For example, other embodiments may be implemented in a network computer. Computer 100 also preferably includes a graphical user interface (GUI) that may be implemented by means of systems software residing in computer-readable media in operation within computer 100.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including an interface and memory controller hub (interface/MCH) 202 and an interface and input/output (I/O) controller hub (interface/ICH) 204. Processing unit 206, main memory 208, and graphics processor 210 are coupled to interface/MCH 202. Processing unit 206 may contain one or more processors and even may be implemented using one or more heterogeneous processor systems. Graphics processor 210 may be coupled to interface/MCH 202 through an accelerated graphics port (AGP), for example.

In the depicted example, local area network (LAN) adapter 212 is coupled to interface/ICH 204, audio adapter 216, keyboard and mouse adapter 220, modem 222, read only memory (ROM) 224, and universal serial bus (USB) and other ports 232. PCI/PCIe devices 234 are coupled to interface/ICH 204 through bus 238. Hard disk drive (HDD) 226 and CD-ROM 230 are coupled to interface/ICH 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may use, for example, an integrated drive electronics (IDE) or serial advanced technology attachment (SATA) interface. Super I/O (SIO) device 236 may also be coupled to interface/ICH 204.

An operating system runs on processing unit 206. This operating system coordinates and controls various components within data processing system 200 in FIG. 2. The operating system may be a commercially available operating system, such as Microsoft® Windows Vista™. Microsoft® and Windows Vista are trademarks of Microsoft Corporation in the United States, other countries, or both. Alternatively, the operating system may be an AIX® operating system. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as HDD 226. These instructions and may be loaded into main memory 208 for execution by processing unit 206. The processes of the illustrative embodiments may be performed by processing unit 206 using computer implemented instructions, which may be located in a memory. An example of a memory is main memory 208, ROM 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 may be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 may be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as modem 222 or LAN adapter 212. Further, a memory may be, for example, main memory 208 or a cache such as found in interface/MCH 202. Also, a processing unit may include one or more processors or CPUs.

The depicted examples in FIG. 1 and FIG. 2 are not meant to imply architectural limitations. In addition, the illustrative embodiments provide for a computer implemented method, system, and computer usable program code for compiling source code and for executing code. The methods described with respect to the depicted embodiments may be performed in a data processing system, such as data processing system 100 shown in FIG. 1 or data processing system 200 shown in FIG. 2.

Illustrative embodiments provide a computer implemented method, system, and computer usable program code for balancing component load in an I/O stack of an operating system. In response to receiving an I/O request, a thresholding component in the I/O stack updates threshold data to reflect a current number of pending requests for the thresholding component. A thresholding component is a software component in the I/O stack that includes threshold data in its internal structure. The threshold data not only includes the current number of pending I/O requests for the thresholding component, but also includes the natural capacity of the thresholding component to handle I/O requests, service times for the thresholding component to process I/O requests, and threshold data for one or more adjacent thresholding components. Thus, a thresholding component is able to make intelligent I/O request throttling and routing decisions on-the-fly based on the threshold data.

In response to analyzing the updated threshold data, the thresholding component determines if throttling is necessary. Throttling delays processing and therefore delays issuance of I/O requests to subsequent components in the I/O stack. In response to determining that throttling is not necessary, the thresholding component creates a corresponding I/O request to the received I/O request and sets a thresholding flag in the corresponding I/O request. The thresholding flag indicates that the corresponding I/O request is sent by a thresholding component. Then, the thresholding component sends the corresponding I/O request to one of a plurality of lower level components in the I/O stack for processing based on the analyzed data to balance component load.

In response to determining that throttling is necessary, the thresholding component places the I/O request aside for later processing. Subsequently, the thresholding component updates the threshold data to reflect that throttling was performed.

In response to completing processing of the I/O request, the thresholding component populates the I/O request with updated threshold data. Afterward, the thresholding component returns the I/O request with the updated threshold data to an upper level component that sent the I/O request. The upper level component updates an internal structure of the upper level component to reflect the updated threshold data. In addition, the thresholding component publishes the threshold data to one or more adjacent components in the I/O stack and/or to a central registry.

The upper level component searches the central registry for a lower level component function and calls the lower level component function with a request for current threshold data for the lower level component. The lower level component returns the current threshold data to the upper level component via a function return. Then, the upper level component updates its internal structure to reflect the current threshold data of the lower level component.

Illustrative embodiments provide an infrastructure within which individual layers of the I/O stack provide thresholding services that include, for example, publication of threshold information, queue management, scheduling, and throttling as appropriate based on instantaneous workload. Each thresholding I/O component tracks current I/O request activity levels, such as depth of an I/O request backlog queue and I/O request service times. Thresholding components may implement a heuristic to determine their threshold status.

I/O requests are passed from one thresholding component (upper) to another (lower). Lower level components may publish current threshold status information to upper level layers. Upper level layers may use this published threshold status information to manage future I/O requests by, for example, re-routing I/O requests to other components or devices, propagating threshold status information up the I/O stack, etc. As a result, data processing systems, by utilizing illustrative embodiments, may distribute I/O requests to a plurality of components in an I/O stack to balance component load, thereby increasing system productivity and preventing system crashes.

Figure 3:
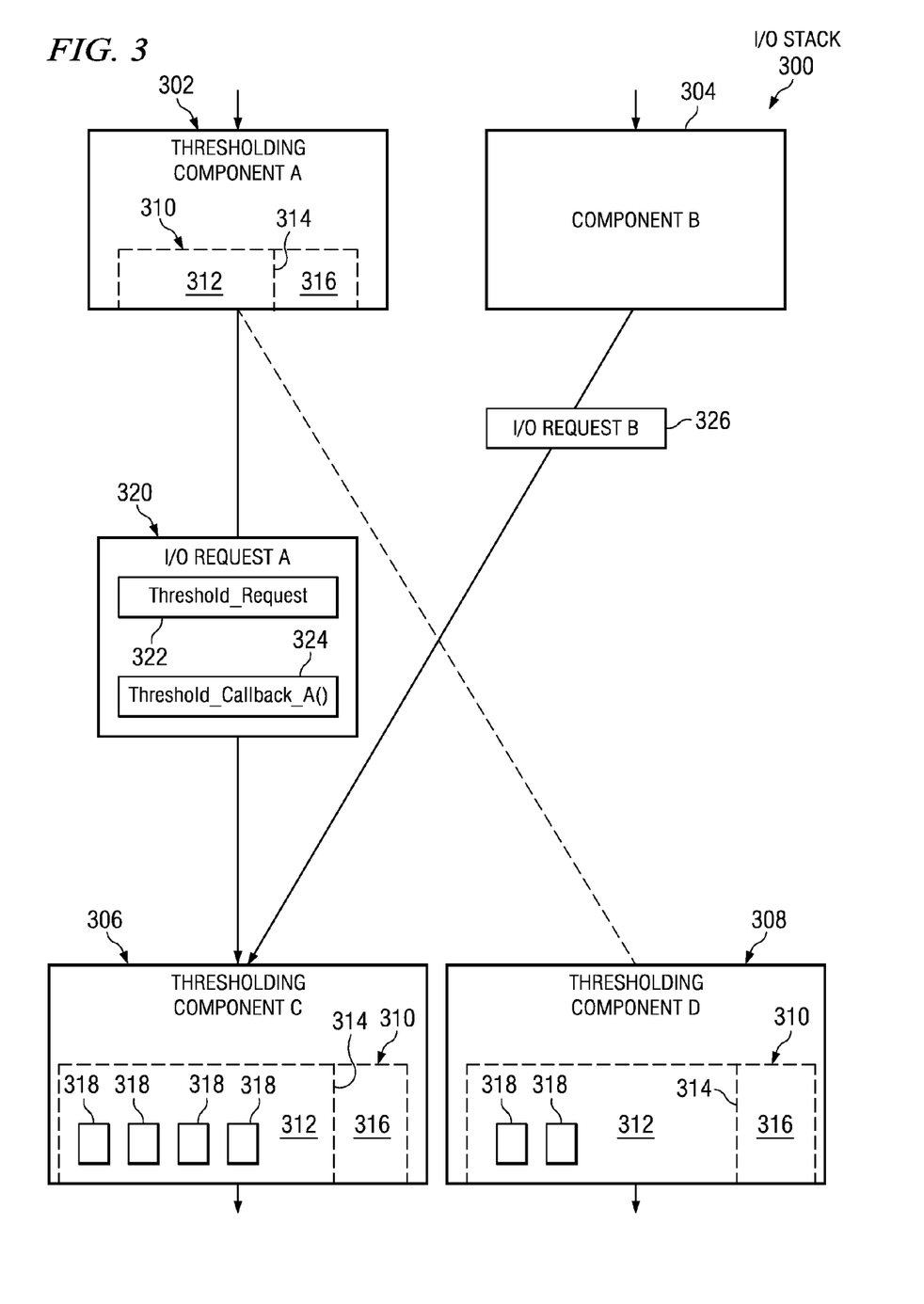
FIG. 3 is a block diagram illustrating an I/O stack of components in accordance with an illustrative embodiment.

With reference now to FIG. 3, a block diagram illustrating an I/O stack of components is depicted in accordance with an illustrative embodiment. I/O stack 300 may be implemented in an operating system within a data processing system, such as, for example, data processing system 200 in FIG. 2. I/O stack 300 includes four software components. However, it should be noted that illustrative embodiments are not limited to four components within I/O stack 300. I/O stack 300 may include more or fewer components as necessary.

Software components A 302, C 306, and D 308 are thresholding components, whereas software component B 304 is not a thresholding component. Thresholding component A 302, component B 304, thresholding component C 306, and thresholding component D 308 receive and process I/O requests from either a user application or from another software component in I/O stack 300. Thresholding components A 302, C 306, and D 308 include in their internal structure, such as internal structures 310, threshold data. The threshold data may, for example, include information regarding a current number of pending I/O requests, natural capacity to handle I/O requests, service times to process I/O requests, and threshold data for adjacent thresholding components.

Area 312 in internal structure 310 includes the total number of pending I/O requests for that particular thresholding component. For example, thresholding component A 302 has no pending I/O requests 318, thresholding component C 306 has four pending I/O requests 318, and thresholding component D 308 has two pending I/O requests 318 in area 312. Line 314 represents the natural capacity, or the threshold, of that particular thresholding component to handle I/O requests.

For example, in this particular illustration thresholding component C 306 is nearing its natural capacity 314, or its threshold, for handling pending I/O requests 318. As depicted, thresholding component C 306 may handle one more pending I/O request 318 before reaching its natural capacity 314. On the other hand, thresholding component D 308 may handle three or four more pending I/O requests 318 before reaching its natural capacity 314. The thresholding component may use this nearing natural capacity information to determine whether the thresholding component needs to perform I/O request throttling.

Area 316 represents an area for storing one or more adjacent thresholding components' threshold data. The thresholding component may use this adjacent thresholding component information to determine which subsequent software component in the I/O stack receives the I/O request for further processing to balance component load.

In this particular example, thresholding component A 302 sends I/O request A 320 to thresholding component C 306 for processing. I/O request A 320 corresponds to the I/O request received by thresholding component A 302 from either a user application or an upper level software component. I/O request A 320 includes thresholding flag 322. Thresholding component A 302 sets thresholding flag 322 in I/O request A 320 to indicate that I/O request A 320 is an I/O request sent from a thresholding component.

After receiving I/O request A 320, thresholding component C 306 populates the structure of I/O request A 320 with threshold data for thresholding component C 306 in an area of the I/O request structure reserved for such use. Subsequent to completing processing of I/O request A 320, thresholding component C 306 returns I/O request A 320, which contains threshold data for thresholding component C 306, to thresholding component A 302.

However, it should be noted that a thresholding component may publish its current threshold data in several ways. Besides publishing the threshold data in the I/O request structure as described in the immediately preceding paragraph above, the receiving or fielding component may publish current threshold data in response to the I/O request hand-off. Alternatively, the receiving component may publish current threshold data by executing a call back function supplied by the sending component in the I/O request structure, such as threshold data call back A request 324. This call back function allows receiving thresholding component C 306 to notify requesting thresholding component A 302 of its current threshold status prior to the I/O request structure being returned to sending/requesting thresholding component A 302. Or, the receiving component may publish current threshold data by return code from acceptance of an I/O request structure. Or, the receiving component may publish current threshold data in response to fielding a threshold status request function call from an upper level component. Or, a component may publish current threshold data in a central registry where other components may search and retrieve this published threshold data.

Further, in this particular illustration, component B 304, which is not a thresholding component, sends typical I/O request B 326 to thresholding component C 306. Furthermore, it should be noted that thresholding components C 306 and D 308 may propagate a corresponding threshold I/O request to either a lower level software component in I/O stack 300 or a physical device, both of which are not shown in this exemplary illustration.

Figure 4:
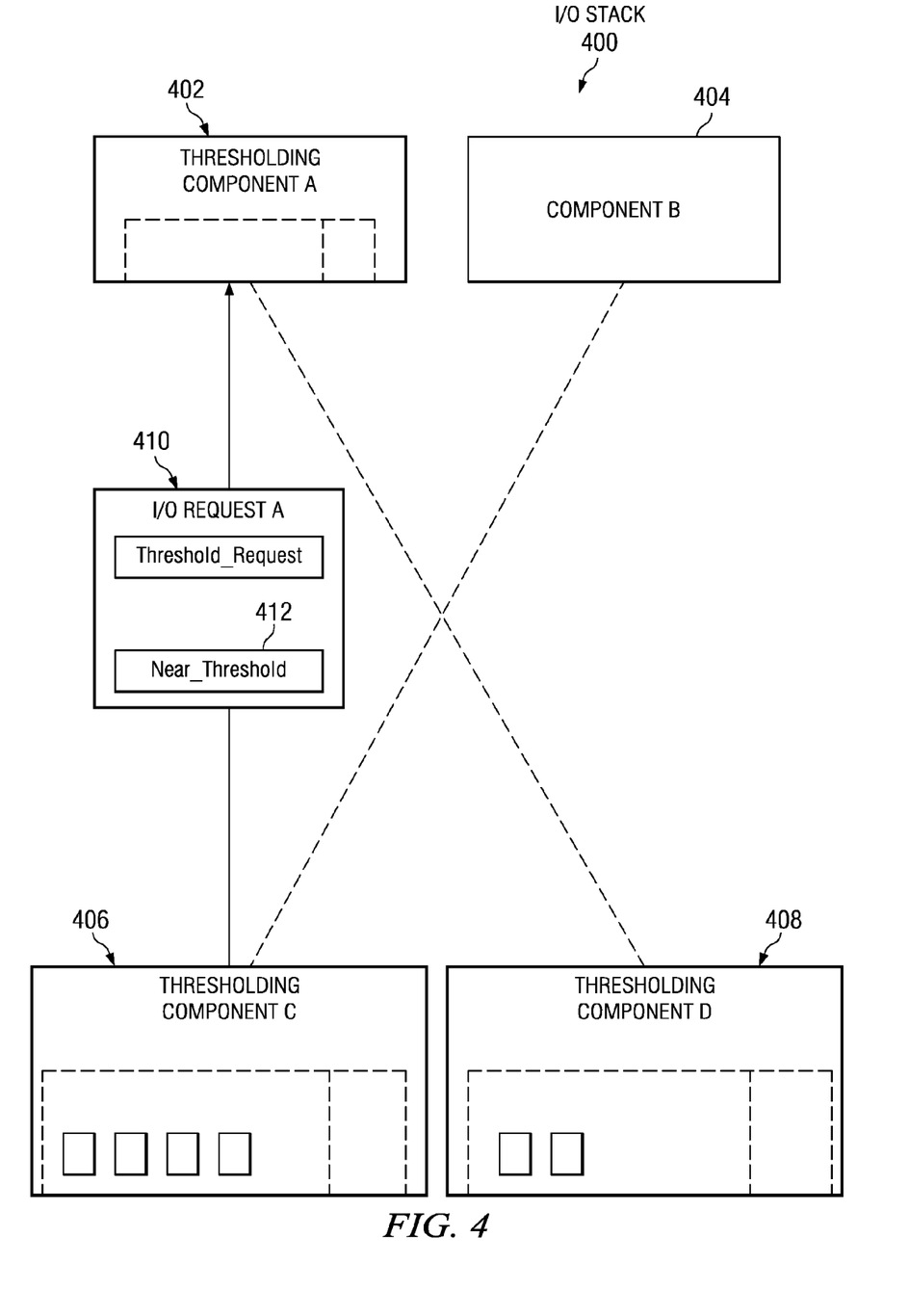
FIG. 4 is an exemplary illustration of a lower level thresholding component returning an I/O request structure to an upper level thresholding component in accordance with an illustrative embodiment.

With reference now to FIG. 4, an exemplary illustration of a lower level thresholding component returning an I/O request structure to an upper level thresholding component is depicted in accordance with an illustrative embodiment. I/O stack 400 may, for example, be I/O stack 300 in FIG. 3. I/O stack 400 includes thresholding component A 402, component B 404, thresholding component C 406, and thresholding component D 408, such as thresholding component A 302, component B 304, thresholding component C 306, and thresholding component D 308 in FIG. 3.

After processing an I/O request, a lower level thresholding component includes its threshold data in the I/O request structure when the lower level thresholding component returns a marked-as-thresholding I/O request structure to the sending upper level thresholding component. In this exemplary illustration, thresholding component C 406 returns marked-as-thresholding I/O request A 410, such as I/O request A 320 in FIG. 3, to thresholding component A 402 in response to a threshold data call back request, such as threshold data call back A request 324 in FIG. 3. Thresholding component C 406 indicates in returned I/O request A 410 that its threshold status 412 is near threshold.

Threshold status may be "few-valued", such as below threshold, near threshold, or exceeded threshold. Alternatively, threshold status may be "many-valued", such as any percentage value (e.g., 0%, 10%, 25%, 50%, 75%, 100%, or any percentage value in between or beyond). However, it should be noted that threshold status 412 may also include other threshold data, such as, for example, current service times for I/O requests.

Figure 5:
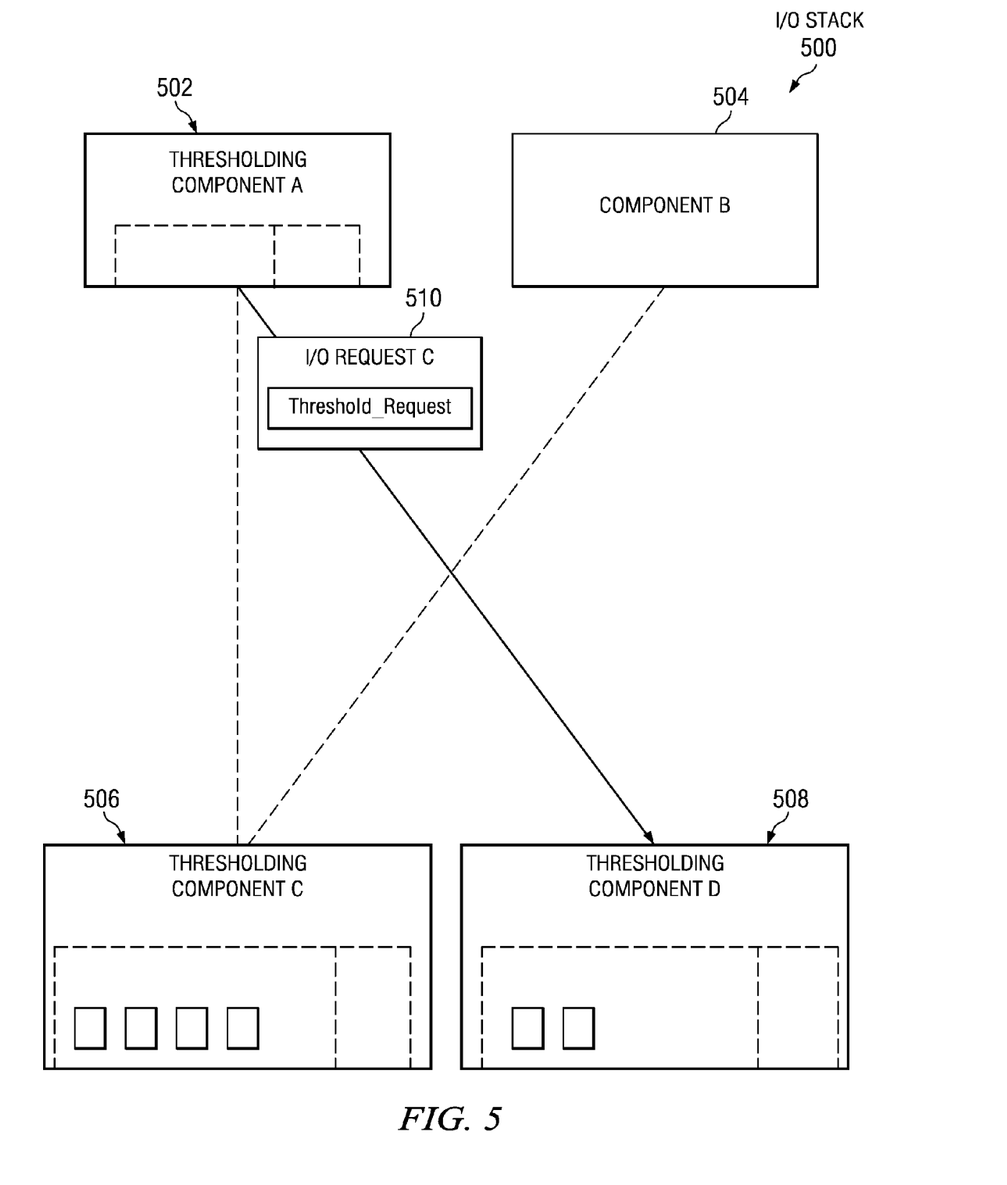
FIG. 5 is an exemplary illustration of an upper level thresholding component sending an I/O request to an alternate lower level component in accordance with an illustrative embodiment.

With reference now to FIG. 5, an exemplary illustration of an upper level thresholding component sending an I/O request to an alternate lower level component is depicted in accordance with an illustrative embodiment. I/O stack 500 may, for example, be I/O stack 400 in FIG. 4. I/O stack 500 includes thresholding component A 502, component B 504, thresholding component C 506, and thresholding component D 508, such as thresholding component A 402, component B 404, thresholding component C 406, and thresholding component D 408 in FIG. 4.

After receiving threshold data from other adjacent thresholding components, a thresholding component may update or adjust its own internal structure, such as internal structure 310 in FIG. 3, to reflect this new threshold data. Subsequent to analyzing this new threshold data, the thresholding component may elect to re-route future I/O requests to alternate software components in I/O stack 500 accordingly. In this exemplary illustration, thresholding component A 502 chooses to satisfy marked-as-thresholding I/O request C 510 via alternate thresholding component D 508 because customary thresholding component C 506 previously indicated in a threshold status response, such as threshold status 412 in FIG. 4, that it is near threshold.

In addition, thresholding component A 502 may also elect to perform I/O throttling based on current threshold data and delay the issuance of I/O request C 510. Thresholding component A 502 may perform this I/O throttling if, for example, thresholding component A 502 expected thresholding component C 506 I/O request service times to degrade as thresholding component C 506's threshold was approached.

Figure 6:
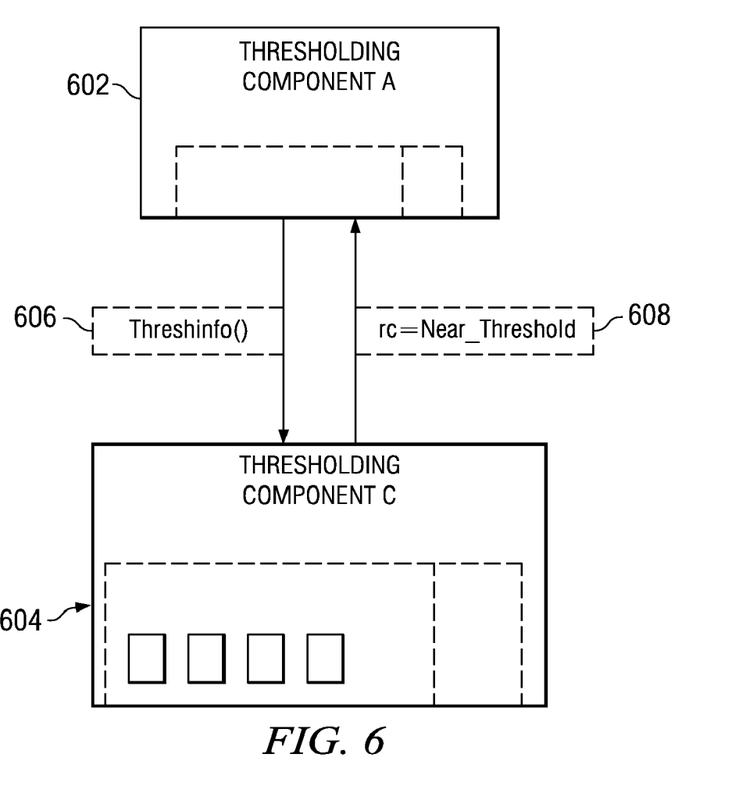
FIG. 6 is an exemplary illustration of an upper level thresholding component calling a lower level thresholding component threshold function in accordance with an illustrative embodiment.

With reference now to FIG. 6, an exemplary illustration of an upper level thresholding component calling a lower level thresholding component threshold function is depicted in accordance with an illustrative embodiment. Thresholding components may make or entertain function calls to request or publish threshold data, such as, for example, threshold status. Further, thresholding components may suggest threshold changes to adjacent thresholding components, as opposed to merely publishing the threshold data in completed I/O request structures. In this exemplary illustration, thresholding component A 602 calls threshold information function 606 for thresholding component C 604. Thresholding component C 604 may, for example, publish its threshold function in a central registry. As a result, thresholding component A 602 may look up this published threshold function data in the central registry and make calls to the function. In response to thresholding component A 602 calling threshold information function 606, thresholding component C 604 returns threshold status response 608, which indicates that thresholding component C 604 is near threshold, to thresholding component A 602.

Figure 7:
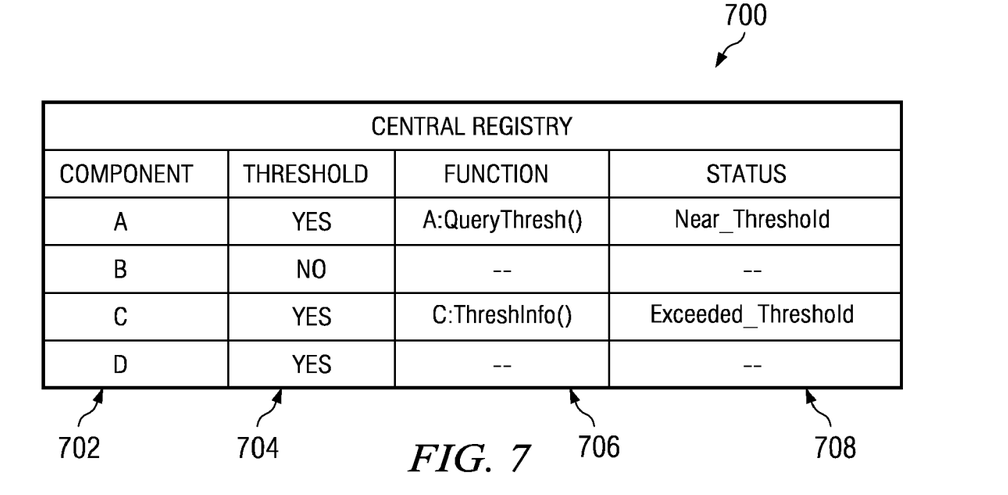
FIG. 7 is an exemplary illustration of a central registry in accordance with an illustrative embodiment.

With reference now to FIG. 7, an exemplary illustration of a central registry is depicted in accordance with an illustrative embodiment. Central registry 700 may be implemented in a storage device, such as, for example, main memory 208, ROM 224, HDD 226, or CD-ROM 230 in FIG. 2. Central registry 700 is a repository for storing threshold data for one or more thresholding components in an I/O stack, such as I/O stack 300 in FIG. 3. Thresholding components may publish function entry points for thresholding functions, as well as current threshold status in central registry 700.

Central registry 700 includes component 702, threshold 704, function 706, and status 708. However, it should be noted that central registry 700 may contain more or less threshold data as required by processes of illustrative embodiments. Component 702 lists the component names within the I/O stack. Threshold 704 lists whether the component is a thresholding component or not. Function 706 lists the threshold function of thresholding components. Status 708 lists current threshold status of thresholding components.

Figure 8:
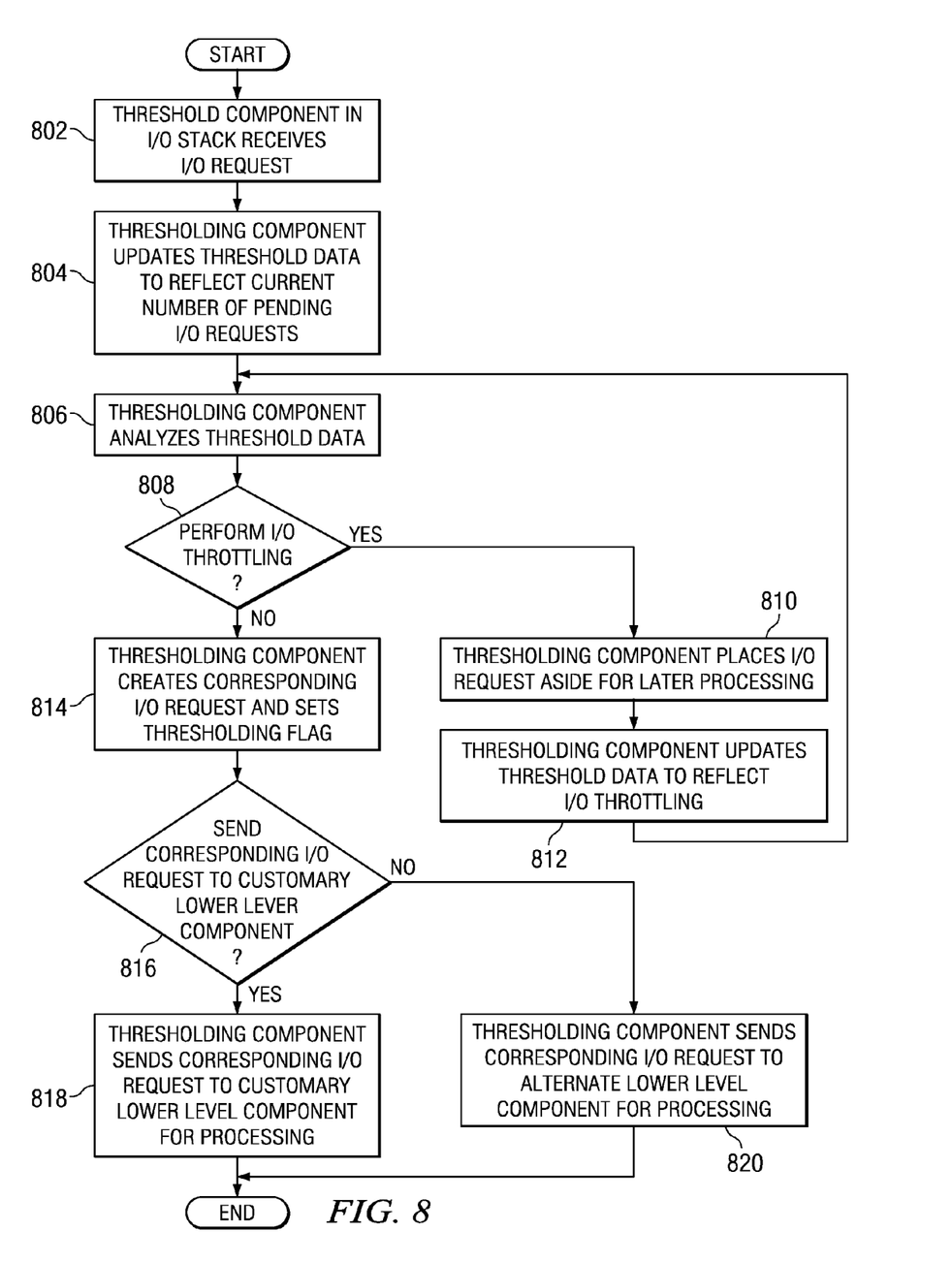
FIG. 8 is a flowchart illustrating an exemplary process for I/O request load balancing in accordance with an illustrative embodiment.

With reference now to FIG. 8, a flowchart illustrating an exemplary process for I/O request load balancing is shown in accordance with an illustrative embodiment. The process shown in FIG. 8 may be implemented in an I/O stack, such as, for example, I/O stack 300 in FIG. 3.

The process begins when a thresholding component in the I/O stack, such as thresholding component A 302 in FIG. 3, receives an I/O request from either a user application or an upper level component (step 802). After receiving the I/O request in step 802, the thresholding component updates threshold data to reflect its current number of pending I/O requests (step 804). In addition to the number of currently pending I/O requests, the threshold data may, for example, also include other information, such as the natural capacity of the thresholding component to handle I/O requests, service times to process previous I/O requests, and threshold data for adjacent thresholding components, such as thresholding component C 306 and thresholding component D 308 in FIG. 3, in the I/O stack. The thresholding component may incorporate this updated threshold data into its own internal structure, such as internal structure 310 in FIG. 3, by adjusting its internal structure to include this threshold data. In addition, the thresholding component may publish this threshold data to adjacent thresholding components within the I/O stack and/or to a central registry, such as, for example, central registry 700 in FIG. 7.

Subsequent to updating the threshold data in step 804, the thresholding component analyzes the updated threshold data (step 806). Then, the thresholding component makes a determination as to whether to perform I/O throttling based on the threshold data analysis (step 808). If the thresholding component performs I/O throttling, yes output of step 808, then the thresholding component places the I/O request aside for later processing (step 810). Afterward, the thresholding component updates the threshold data to reflect the I/O throttling (step 812). In addition to updating the threshold data, the thresholding component may also publish this updated threshold data, which reflects the I/O throttling, to one or more adjacent thresholding components or a central registry so that a requestor may become aware of the I/O throttling action before a return of the set-aside request. The process returns to step 806 thereafter where the thresholding component analyzes the updated threshold data.

If the thresholding component does not perform I/O throttling, no output of step 808, then the thresholding component creates a corresponding I/O request to the original I/O request received by the thresholding component in step 802 and sets a thresholding flag, such as thresholding flag 322 in FIG. 3 (step 814). Subsequently, the thresholding component makes a determination as to where to send the I/O request (step 816). If the thresholding component determines to send the corresponding I/O request to the customary lower level component, yes output of step 816, then the thresholding component sends the corresponding I/O request to the customary lower level component for processing (step 818). The process terminates thereafter. If the thresholding component determines not to send the corresponding I/O request to the customary lower level component, no output of step 816, then the thresholding component sends the corresponding I/O request to an alternate lower level component for processing (step 820). The thresholding component may send the corresponding I/O request to the alternate lower level component because, for example, the customary lower level component is near, or has exceeded, its natural capacity to handle I/O requests. Thus, illustrative embodiments provide the ability to balance the I/O request load between I/O stack components when necessary. The process terminates thereafter.

Figure 9:
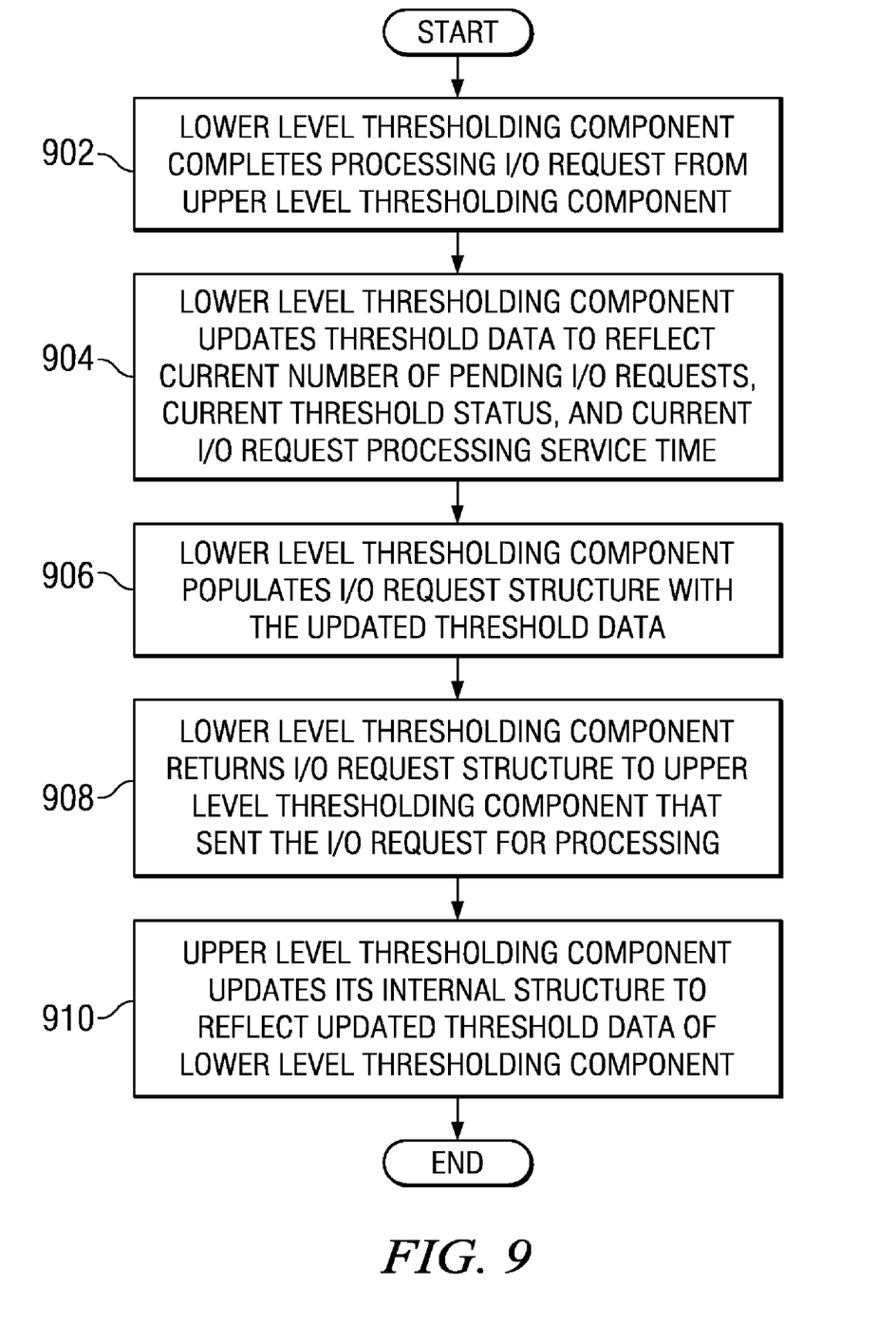
FIG. 9 is a flowchart illustrating an exemplary process for updating threshold data in accordance with an illustrative embodiment.

With reference now to FIG. 9, a flowchart illustrating an exemplary process for updating threshold data is shown in accordance with an illustrative embodiment. The process shown in FIG. 9 may be implemented in an I/O stack, such as, for example, I/O stack 400 in FIG. 4.

The process begins when a lower level thresholding component in the I/O stack, such as thresholding component C 406 in FIG. 4, completes processing of an I/O request received from an upper level thresholding component, such as thresholding component A 402 in FIG. 4 (step 902). After completing processing of the I/O request in step 902, the lower level thresholding component updates threshold data to reflect, for example, the current number of pending I/O requests, the current threshold status, and the current I/O request processing service time for the lower level thresholding component (step 904). Then, the lower level thresholding component populates the I/O request structure with the updated threshold data (step 906).

Subsequent to populating the I/O request structure with the updated threshold data in step 906, the lower level thresholding component returns the I/O request structure containing the updated threshold data to the upper level thresholding component that sent the I/O request for processing (step 908).

Afterward, the upper level thresholding component updates its own internal structure, such as internal structure 310 in FIG. 3, to reflect the updated threshold data of the lower level thresholding component (step 910). The process terminates thereafter.

Figure 10:
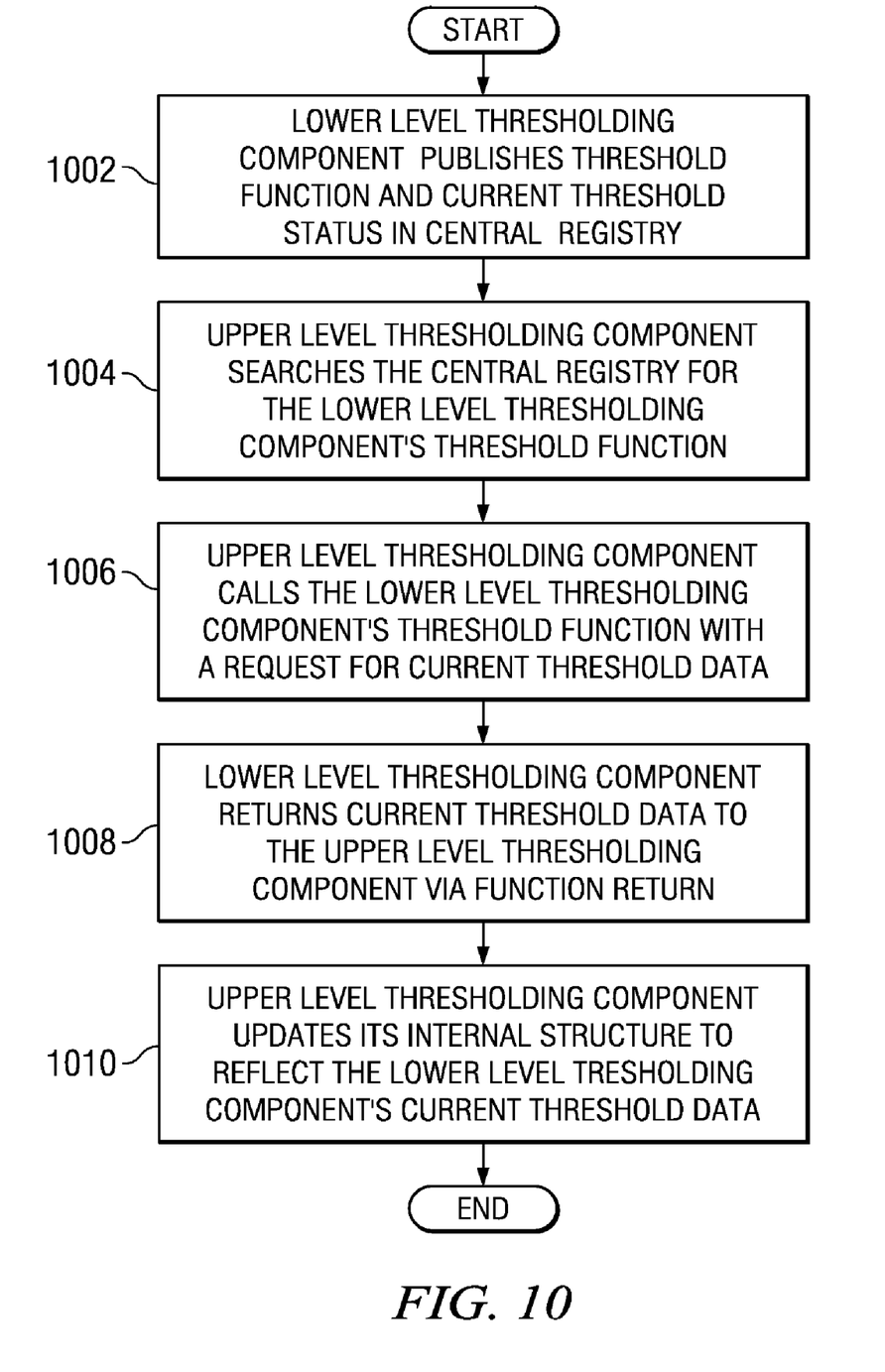
FIG. 10 is a flowchart illustrating an exemplary process for utilizing a central registry to store threshold data in accordance with an illustrative embodiment.

With reference now to FIG. 10, a flowchart illustrating an exemplary process for utilizing a central registry to store threshold data is shown in accordance with an illustrative embodiment. The process shown in FIG. 10 may be implemented in an I/O stack, such as, for example, I/O stack 300 in FIG. 3.

The process begins when a lower level thresholding component in the I/O stack, such as thresholding component C 306 in FIG. 3, publishes its threshold function and current threshold status in a central registry, such as central registry 700 in FIG. 7 (step 1002). However, it should be noted that thresholding components may publish any or all of their threshold data in the central registry. Afterward, an upper level thresholding component, such as thresholding component A 402 in FIG. 4, searches the central registry for the lower level thresholding component's threshold function (step 1004).

Then, the upper level thresholding component calls the lower level thresholding component's threshold function with a request for current threshold data (step 1006). Subsequently, the lower level thresholding component returns its current threshold data to the upper level thresholding component via a function return (step 1008). Afterward, the upper level thresholding component updates its internal structure, such as internal structure 310 in FIG. 3, to reflect the lower level thresholding component's current threshold data (step 1010). The process terminates thereafter.

Thus, illustrative embodiments provide a computer implemented method, system, and computer usable program code for distributing I/O requests to a plurality of software components in an I/O stack of an operating system to balance component load, increase system productivity, and prevent system crashes. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable storage medium providing program code for use by or in connection with a computer or any instruction execution system. For the purposes of this description, a computer-usable or computer-readable storage medium may be any tangible apparatus that may contain or store the program for use by or in connection with the instruction execution system, apparatus, or device.

The medium may be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk— read only memory (CD-ROM), compact disk—read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for balancing component load, the computer implemented method comprising:
responsive to receiving a request to form a received request, updating, by a data processing system, data to reflect a current number of pending requests to form updated data;
publishing, by the data processing system, the updated data to a central registry;
responsive to analyzing the updated data to form analyzed data, determining, by the data processing system, if throttling is necessary;
responsive to determining that throttling is not necessary, creating, by the data processing system, a corresponding request to the received request, setting a flag in the corresponding request, and sending the corresponding request to one of a plurality of lower level components of an input/output stack of an operating system in the data processing system for processing based on the analyzed data to balance component load in the input/output stack of the operating system;
responsive to determining that throttling is necessary, placing, by the data processing system, the request aside for later processing and updating the data to reflect the throttling; and
responsive to a lower level component completing processing of the request, populating, by the data processing system, the request with the updated data and returning the request with the updated data to an upper level component that sent the request, wherein the upper level component updates an internal structure of the upper level component to reflect the updated data, and wherein the upper level component searches the central registry for a lower level component function, and wherein the upper level component calls the lower level component function with a request for current data, and wherein a lower level component returns the current data to the upper level component via a function return, and wherein the upper level component updates the internal structure of the upper level component to reflect the current data of the lower level component.

2. The computer implemented method of claim 1, further comprising:
publishing the updated data to an adjacent component.

3. The computer implemented method of claim 2, wherein the updating, determining, creating, setting, sending, placing, populating, returning, and publishing steps are performed by a thresholding component in the input/output stack of the operating system in the data processing system.

4. The computer implemented method of claim 1, wherein the request is an input/output request.

5. The computer implemented method of claim 1, wherein the data is threshold data and wherein the threshold data includes the current number of pending requests for a component, a natural capacity to handle requests for the component, service times to process the requests for the component, and threshold data for one or more adjacent components.

6. The computer implemented method of claim 1, wherein the flag is a thresholding flag, and wherein the thresholding flag indicates that the corresponding request is sent from a thresholding component in the input/output stack of the operating system in the data processing system.

7. A data processing system for balancing component load, the data processing system comprising:
a bus system;
a storage device connected to the bus system, wherein the storage device stores a set of instructions; and
a processing unit connected to the bus system, wherein the processing unit executes the set of instructions to:
update data to reflect a current number of pending requests to form updated data in response to receiving a request to form a received request;
publish the updated data to a central registry;
determine if throttling is necessary in response to analyzing the updated data to form analyzed data;
create a corresponding request to the received request, set a flag in the corresponding request, and send the corresponding request to one of a plurality of lower level components of an input/output stack of an operating system in the data processing system for processing based on the analyzed data to balance component load in the input/output stack of the operating system in response to determining that throttling is not necessary;
place the request aside for later processing and update the data to reflect the throttling in response to determining that throttling is necessary; and
populate the request with the updated data and return the request with the updated data to an upper level component that sent the request in response to a lower level component completing processing of the request, wherein the upper level component updates an internal structure of the upper level component to reflect the updated data, and wherein the upper level component searches the central registry for a lower level component function, and wherein the upper level component calls the lower level component function with a request for current data, and wherein a lower level component returns the current data to the upper level component via a function return, and wherein the upper level component updates the internal structure of the upper level component to reflect the current data of the lower level component.

8. The data processing system of claim 7, wherein the processing unit further executes the set of instructions to:
publish the updated data to an adjacent component.

9. The data processing system of claim 8, wherein the set of instructions to update, determine, create, set, send, place, populate, return, and publish are performed by a thresholding component in the input/output stack of the operating system in the data processing system.

10. The data processing system of claim 7, wherein the request is an input/output request.

11. The data processing system of claim 7, wherein the data is threshold data and wherein the threshold data includes the current number of pending requests for a component, a natural capacity to handle requests for the component, service times to process the requests for the component, and threshold data for one or more adjacent components.

12. The data processing system of claim 7, wherein the flag is a thresholding flag, and wherein the thresholding flag indicates that the corresponding request is sent from a thresholding component in the input/output stack of the operating system in the data processing system.

13. A computer program product stored on a computer readable storage medium encoded with computer usable program code that is executable by a computer for balancing component load, the computer program product comprising:
computer usable program code for updating data to reflect a current number of pending requests to form updated data in response to receiving a request to form a received request;
computer usable program code for publishing the updated data to a central registry;
computer usable program code for determining if throttling is necessary in response to analyzing the updated data to form analyzed data;
computer usable program code for creating a corresponding request to the received request, setting a flag in the corresponding request, and sending the corresponding request to one of a plurality of lower level components of an input/output stack of an operating system in a data processing system for processing based on the analyzed data to balance component load in the input/output stack of the operating system in response to determining that throttling is not necessary;
computer usable program code for placing the request aside for later processing and updating the data to reflect the throttling in response to determining that throttling is necessary; and
computer usable program code for populating the request with the updated data and returning the request with the updated data to an upper level component that sent the request in response to a lower level component completing processing of the request, wherein the upper level component updates an internal structure of the upper level component to reflect the updated data, and wherein the upper level component searches the central registry for a lower level component function, and wherein the upper level component calls the lower level component function with a request for current data, and wherein a lower level component returns the current data to the upper level component via a function return, and wherein the upper level component updates the internal structure of the upper level component to reflect the current data of the lower level component.

14. The computer program product of claim 13, further comprising:
computer usable program code for publishing the updated data to an adjacent component.

15. The computer program product of claim 14, wherein the computer usable program code for updating, determining, creating, setting, sending, placing, populating, returning, and publishing are performed by a thresholding component in the input/output stack of the operating system in the data processing system.

16. The computer program product of claim 13, wherein the request is an input/output request.

17. The computer program product of claim 13, wherein the data is threshold data and wherein the threshold data includes the current number of pending requests for a component, a natural capacity to handle requests for the component, service times to process the requests for the component, and threshold data for one or more adjacent components.

18. The computer program product of claim 13, wherein the flag is a thresholding flag, and wherein the thresholding flag indicates that the corresponding request is sent from a thresholding component in the input/output stack of the operating system in the data processing system.

19. A apparatus for balancing component load, the apparatus comprising:
means for updating data to reflect a current number of pending requests to form updated data in response to receiving a request to form a received request;
means for publishing the updated data to a central registry;
means for determining if throttling is necessary in response to analyzing the updated data to form analyzed data;
means for creating a corresponding request to the received request, setting a flag in the corresponding request, and sending the corresponding request to one of a plurality of lower level components of an input/output stack of an operating system in a data processing system for processing based on the analyzed data to balance component load in the input/output stack of the operating system in response to determining that throttling is not necessary;
means for placing the request aside for later processing and updating the data to reflect the throttling in response to determining that throttling is necessary; and
means for populating the request with the updated data and returning the request with the updated data to an upper level component that sent the request in response to a lower level component completing processing of the request, wherein the upper level component updates an internal structure of the upper level component to reflect the updated data, and wherein the upper level component searches the central registry for a lower level component function, and wherein the upper level component calls the lower level component function with a request for current data, and wherein a lower level component returns the current data to the upper level component via a function return, and wherein the upper level component updates the internal structure of the upper level component to reflect the current data of the lower level component.

* * * * *